United States Patent
Ravella et al.

(10) Patent No.: US 12,275,440 B2
(45) Date of Patent: Apr. 15, 2025

(54) VARIABLE SAFE STEERING HANDS-OFF TIME AND WARNING

(71) Applicant: PlusAI, Inc., Santa Clara, CA (US)

(72) Inventors: Siva Bhargav Ravella, San Jose, CA (US); Amit Kumar, Sunnyvale, CA (US); Qiqiang Hou, San Jose, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/499,869

(22) Filed: Nov. 1, 2023

(65) Prior Publication Data
US 2024/0367692 A1    Nov. 7, 2024

Related U.S. Application Data

(63) Continuation of application No. 18/311,184, filed on May 2, 2023, now Pat. No. 11,840,265.

(51) Int. Cl.
*B60W 60/00* (2020.01)
*B60W 50/14* (2020.01)

(52) U.S. Cl.
CPC ........ *B60W 60/0057* (2020.02); *B60W 50/14* (2013.01); *B60W 60/0027* (2020.02);
(Continued)

(58) Field of Classification Search
CPC ......... B60W 60/0057; B60W 60/0051; B60W 60/0027; B60W 50/14; B60W 2555/20;
(Continued)

(56) References Cited

U.S. PATENT DOCUMENTS

| 8,909,428 B1 | 12/2014 | Lombrozo |
| 10,065,679 B2 | 9/2018 | Kinugasa et al. |

(Continued)

FOREIGN PATENT DOCUMENTS

| EP | 3845431 A2 * | 7/2021 | ............ B60W 40/08 |
| EP | 3915852 A1 | 12/2021 | |

(Continued)

OTHER PUBLICATIONS

Kashyap et al., "Driver Drowsiness Monitoring by Learning Vehicle Telemetry Data," 2017, Publisher: IEEE.*

(Continued)

*Primary Examiner* — Tuan C To
(74) *Attorney, Agent, or Firm* — Kilpatrick Townsend & Stockton LLP

(57) ABSTRACT

Techniques are described for providing a hands-off steering wheel detection warning. An example method can include a vehicle computer determining a real-time level of fatigue of a driver of an autonomous vehicle. The vehicle computer can determine an operating parameter associated with an environment in which the autonomous vehicle is traveling. The vehicle computer can generate, using a machine learning model, a predicted driving pattern of a second vehicle traveling in the environment. The vehicle computer can determine a time interval for providing a hands-off steering wheel detection warning based at least in part on the real-time level of fatigue of the driver, the operating parameter, and the predicted driving pattern of the second vehicle. The vehicle computer can identify a final time interval for providing a hands-off steering wheel detection warning. The vehicle computer can output the hands-off steering wheel detection warning after the final time interval has elapsed.

20 Claims, 6 Drawing Sheets

(52) U.S. Cl.
CPC ..... *B60W 60/0051* (2020.02); *B60W 2540/22* (2013.01); *B60W 2552/05* (2020.02); *B60W 2554/4046* (2020.02); *B60W 2555/20* (2020.02)

(58) Field of Classification Search
CPC ..... B60W 2552/05; B60W 2554/4046; B60W 2540/22; B60W 40/06; B60W 40/08
USPC .......................................................... 701/23
See application file for complete search history.

(56) References Cited

U.S. PATENT DOCUMENTS

| | | | |
|---|---|---|---|
| 10,272,914 | B2 | 4/2019 | Harda et al. |
| 10,310,605 | B2 | 6/2019 | Chandy |
| 10,780,915 | B2 | 9/2020 | Rakouth et al. |
| 10,787,123 | B1 | 9/2020 | Kim |
| 11,560,169 | B2 | 1/2023 | Lubischer et al. |
| 2013/0203400 | A1 | 8/2013 | Ricci |
| 2014/0125474 | A1* | 5/2014 | Gunaratne ............. B60Q 9/008 340/439 |
| 2016/0107644 | A1* | 4/2016 | Eigel .................. B62D 15/0265 701/70 |
| 2016/0132054 | A1* | 5/2016 | Eigel ..................... B60W 30/18 701/23 |
| 2020/0192359 | A1 | 6/2020 | Aragon et al. |
| 2021/0024075 | A1 | 1/2021 | Eigel et al. |
| 2021/0209922 | A1 | 7/2021 | Yang et al. |
| 2022/0001874 | A1* | 1/2022 | Yoshida ............ B60W 60/0057 |
| 2023/0092515 | A1 | 3/2023 | Cheon et al. |
| 2024/0326876 | A1* | 10/2024 | Sasayama ......... B60W 60/0053 |

FOREIGN PATENT DOCUMENTS

| | | | |
|---|---|---|---|
| EP | 3919338 A1 * | 12/2021 | ............ B60W 30/12 |
| EP | 3971858 A1 * | 3/2022 | ............ B60W 40/08 |
| WO | 2014158667 A1 | 10/2014 | |

OTHER PUBLICATIONS

U.S. Appl. No. 18/311,184, "Non Final Office Action", Aug. 3, 2023, 11 pages.

U.S. Appl. No. 18/311,184, "Notice of Allowance", Sep. 20, 2023, 9 pages.

Singh et al., "Eye Tracking Based Driver Fatigue Monitoring and Warning System", India International Conference on Power Electronics, 2010, 115 pages.

Wang et al., "Real-Time Detection and Early Warning of Driving Fatigue Based on Basic Scale Entropy", 3rd International Conference on Artificial Intelligence and Advanced Manufacture (AIAM), IEEE, 2021.

* cited by examiner

VARIABLE SAFE STEERING HANDS-OFF TIME AND WARNING

CROSS-REFERENCE TO RELATED APPLICATIONS

This application claims the benefit of U.S. Non-Provisional application Ser. No. 18/311,184, filed on May 2, 2023, which is incorporated by reference herein in its entirety for all purposes.

BACKGROUND

Various vehicles employ computing means to aid automated vehicle operation. Recently, in the automotive industry, much of the focus us on making vehicle operation in an autonomous mode in a safe manner.

One vehicle safety feature is a hands-off time warning system, in which a sensor coupled to a steering wheel can be used by a computing system to determine whether a driver is grasping the steering wheel. If the vehicle's computing system determines that the driver is not grasping the steering wheel upon expiration of a time interval, the computing system can issue a warning to the driver. Vehicle hands-off time warning systems use a one size fits all approach, in which a static time interval is used to issue a warning. This generic warning technique fails to address dynamic situations in which a warning should be issued earlier than the expiration of the static time interval.

Embodiments are directed to address these and other problems, individually and collectively.

BRIEF SUMMARY

Embodiments described herein include a method for hands-off steering wheel detection warning. The method includes a vehicle computer determining a real-time level of fatigue of a driver of the autonomous vehicle. The vehicle computer can determine an operating parameter associated with an environment in which the autonomous vehicle is traveling. The vehicle computer can determine a time interval for providing a hands-off steering wheel detection warning based at least in part on the real-time level of fatigue of the driver, and the operating parameter. The vehicle computer can identify a final time interval for providing a hands-off steering wheel detection warning. The vehicle computer can output the hands-off steering wheel detection warning after the final time interval has elapsed.

Embodiments can further a vehicle computer, including a processor and a computer-readable medium including instructions that, when executed by the processor, can cause the processor to perform operations, including determining a real-time level of fatigue of a driver of the autonomous vehicle. The instructions that, when executed by the processor, can cause the processor to perform operations, including determining an operating parameter associated with an environment in which the autonomous vehicle is traveling. The instructions that, when executed by the processor, can cause the processor to perform operations, including determining a time interval for providing a hands-off steering wheel detection warning based at least in part on the real-time level of fatigue of the driver, and the operating parameter. The instructions that, when executed by the processor, can cause the processor to perform operations, including identifying a final time interval for providing a hands-off steering wheel detection warning. The instructions that, when executed by the processor, can cause the processor to perform operations, including outputting the hands-off steering wheel detection warning after the final time interval has elapsed.

Embodiments can further include a non-transitory computer-readable medium including stored thereon instructions that, when executed by a processor, causes the processor to perform operations including determining a real-time level of fatigue of a driver of the autonomous vehicle. The instructions that, when executed by the processor, can cause the processor to perform operations, including determining an operating parameter associated with an environment in which the autonomous vehicle is traveling. The instructions that, when executed by the processor, can cause the processor to perform operations, including determining a time interval for providing a hands-off steering wheel detection warning based at least in part on the real-time level of fatigue of the driver, and the operating parameter. The instructions that, when executed by the processor, can cause the processor to perform operations, including identifying a final time interval for providing a hands-off steering wheel detection warning. The instructions that, when executed by the processor, can cause the processor to perform operations, including outputting the hands-off steering wheel detection warning after the final time interval has elapsed.

DETAILED DESCRIPTION

Figure 1:
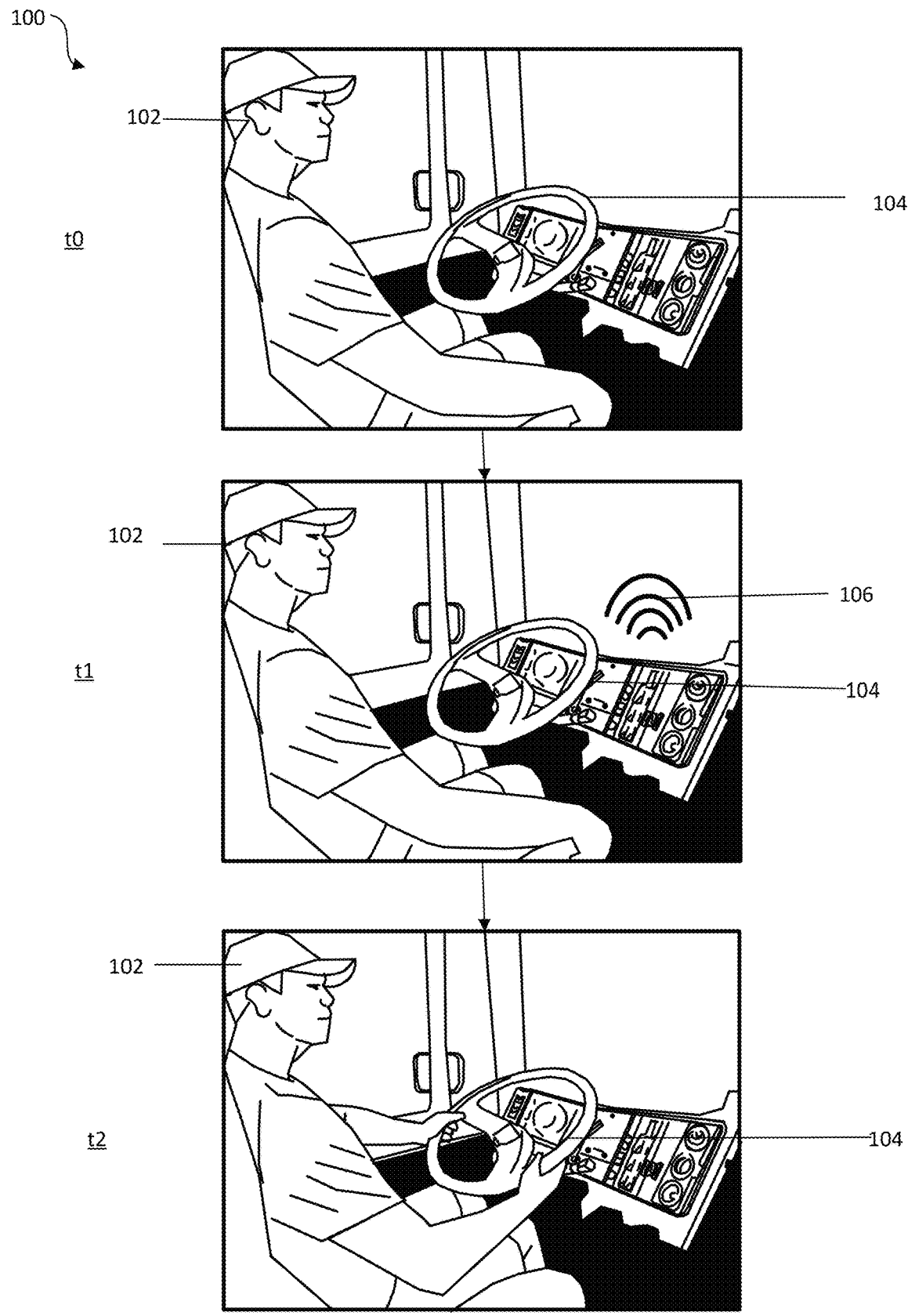
FIG. 1 is an illustration of an autonomous vehicle with hands-off steering wheel detection, according to one or more embodiments.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

A vehicle can include a hands-off time warning system for detecting that a driver has removed their hands from the steering wheel and providing a warning. Conventionally, these hands-off time warning systems have operated under a timer, in which a system starts the timer upon detecting that a driver's hands are off the steering wheel. The system issues a warning if the driver continues to keep their hands off the steering wheel upon expiration of the timer. One issue that can arise is that the length of the timer is determined without consideration of the real-time status of the driver, the vehicle status, and the surrounding environment. For example, in many instances, the length of the timer is based on a governmental regulation that has been negotiated between the automotive industry and the government. This does not take into consideration instances in which a warning should be issued prior to the expiration of a static timer. As such, an improved metric for determining the amount of time between a driver removing their hands from the steering wheel and a warning being issued would be beneficial for vehicle safety.

An autonomous vehicle (AV) is equipped with interior and exterior sensors that can be used to determine an operating parameter of the real-time status of the driver, the vehicle, and the surrounding environment. The sensors can collect real-time data of the driver, vehicle, and the surrounding environment and continuously transmit the data to one or more trained machine learning models. The machine learning models can use the sensor data as inputs and continuously output an expected danger to the driver and/or the vehicle. The output of the one or more machine learning models can be used by a hands-off time warning system to dynamically determine a safe hands-off steering time before a warning gets issued.

Prior to discussing embodiments, some terms can be described in further detail.

As used herein, a "vehicle" may include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode.

As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

A "vehicle computer" may include one or more processors and a memory. A "processor" may include any suitable data computation device or devices. A processor may comprise one or more microprocessors working together to accomplish a desired function. A "memory" may be any suitable device or devices that can store electronic data. A suitable memory may comprise a non-transitory computer readable medium that stores instructions that can be executed by at least one processor to implement a desired method. Examples of memories may comprise one or more memory chips, disk drives, etc. Such memories may operate using any suitable electrical, optical, and/or magnetic mode of operation.

Details of some embodiments will now be described in greater detail.

FIG. 1 is an illustration 100 of an autonomous vehicle with hands-off steering wheel detection, according to one or more embodiments. In particular, FIG. 1 illustrates a driver 102 of an AV at three points in time, t0, t1, and t2. At each point in time, the driver 102 is illustrated seated in a driver's seat of a cab of an AV and in front of a steering wheel 104. At t0, the driver 102 has his hands off of the steering wheel 104 as the AV is moving. The AV can be in a manual mode, in which the driver 102 operates the AV without assistance from an autonomous vehicle mode capability. The AV can also be in an autonomous mode, in which the driver 102 can receive assistance from an autonomous mode capability of the AV. At t0, a hands-off time warning system can collect data from one or more sensors to determine that the driver 102 does not have their hands on the steering wheel 104. The sensors can include various technologies for detecting whether the driver 102 has their hands on the steering wheel 104. For example, the hands-off time warning system can use capacitive-based sensors that detect the driver's grip on the steering wheel 104 based on a change in the capacitance of the steering wheel 104. In other instances, the hands-off time warning system can use pressure-based sensors (e.g., piezoresistive sensors) that detect pressure applied by the driver's grip at one or more positions of the steering wheel 104.

At t1, the hands-off time warning system can determine that the driver's hands are off the steering wheel 104 and that a warning 106 should be issued to prompt the driver 102 to put their hands on the steering wheel 104. The warning 106 can be an audio warning that is loud enough to propagate throughout the cab and warn the driver 102. For example, the warning 106 can be transmitted through one or more speakers arranged in the cab of the AV. The warning 106 can also be a visual warning visible to the driver 102. For example, the warning 106 can be a visual warning displayed on a human machine interface (HMI) of the AV. The warning 106 can also be a sensory warning that can be felt by the driver 102. For example, the warning 106 can be a sensory warning including a vibration of the steering wheel 104 or the driver's seat.

As indicated above, the herein-described hands-off time warning system can dynamically determine when to issue the warning 106 based on an operating parameter of the status of the driver, the vehicle, and/or the surrounding environment. For example, the hands-off time warning system can include one or more sensors for determining the driver's status, for example, the driver's level of fatigue. The hands-off time warning system can further include wireless capability to connect with one or more services using the internet. For example, the hands-off time warning system can connect with a weather service for determining the weather, or a map service for determining a roadway type. The hands-off time warning system can include vehicle sensors for detecting a vehicle status, such as a speed of the AV, an attitude of the AV, a roll of the AV, a pitch of the AV, a braking system status, an engine status, and a speed of the AV. The hands-off time warning system can further include sensors, such as light-based sensors, for determining a surrounding, such as traffic in the AV's lane, traffic in a neighbor lane and objects on or about the roadway.

The hands-off time warning system can further include one or more machine learning models that can receive inputs and predict one or more of the status of the driver, the vehicle, and the surrounding environment. In some instances, certain data can be weighted greater than other data. The collected data can be evaluated, and the hands-off time warning system can determine a time interval for providing a hands-off steering wheel detection warning based on the real-time status of the AV and its surroundings.

The time interval can be responsive to an operating parameter of the real-time status of the driver, the vehicle, or the surrounding environment. For example, in one instance, a first time interval can correspond to a driver 102 that is not fatigued, sunny weather, and little to no vehicular traffic other than the AV. If, however, the real-time status of one or more of the vehicle, and the surrounding environment is indicative of danger, the hands-off time warning system can determine, in real-time, a second time interval that is shorter than the first time interval. For example, in another instance, if the weather has shifted from clear skies to rain, the hands-off time warning system can determine that road condition is more dangerous than with clear skies and determine the shorter second time interval. The collection and processing of data to determine the time interval for providing a hands-off steering wheel detection warning is described with more particularity with respect to FIGS. 2 and 3.

At t2, the driver 102 can grasp the steering wheel 104 in response to receiving the warning. The hands-off time warning system can discontinue the warning 106 based on detecting that the driver 102 is grasping the steering wheel 104. The driver 102 can choose to operate the AV using the steering wheel 104. In the event that the driver 102 releases his grasp of the steering wheel 104, the process can begin again at t0.

Figure 2:
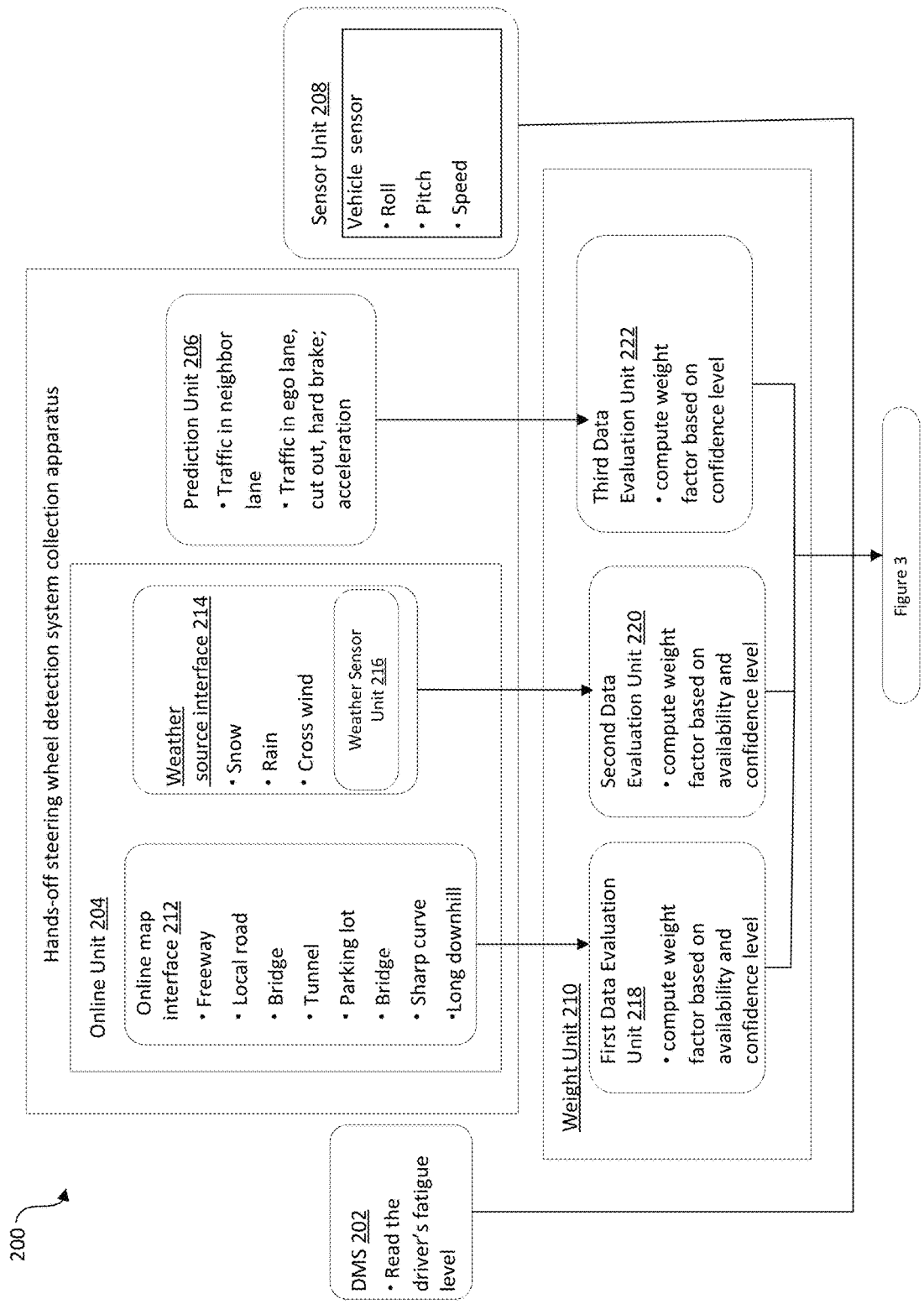
FIG. 2 is an illustration of a hands-off time warning system, according to one or more embodiments.
Figure 3:
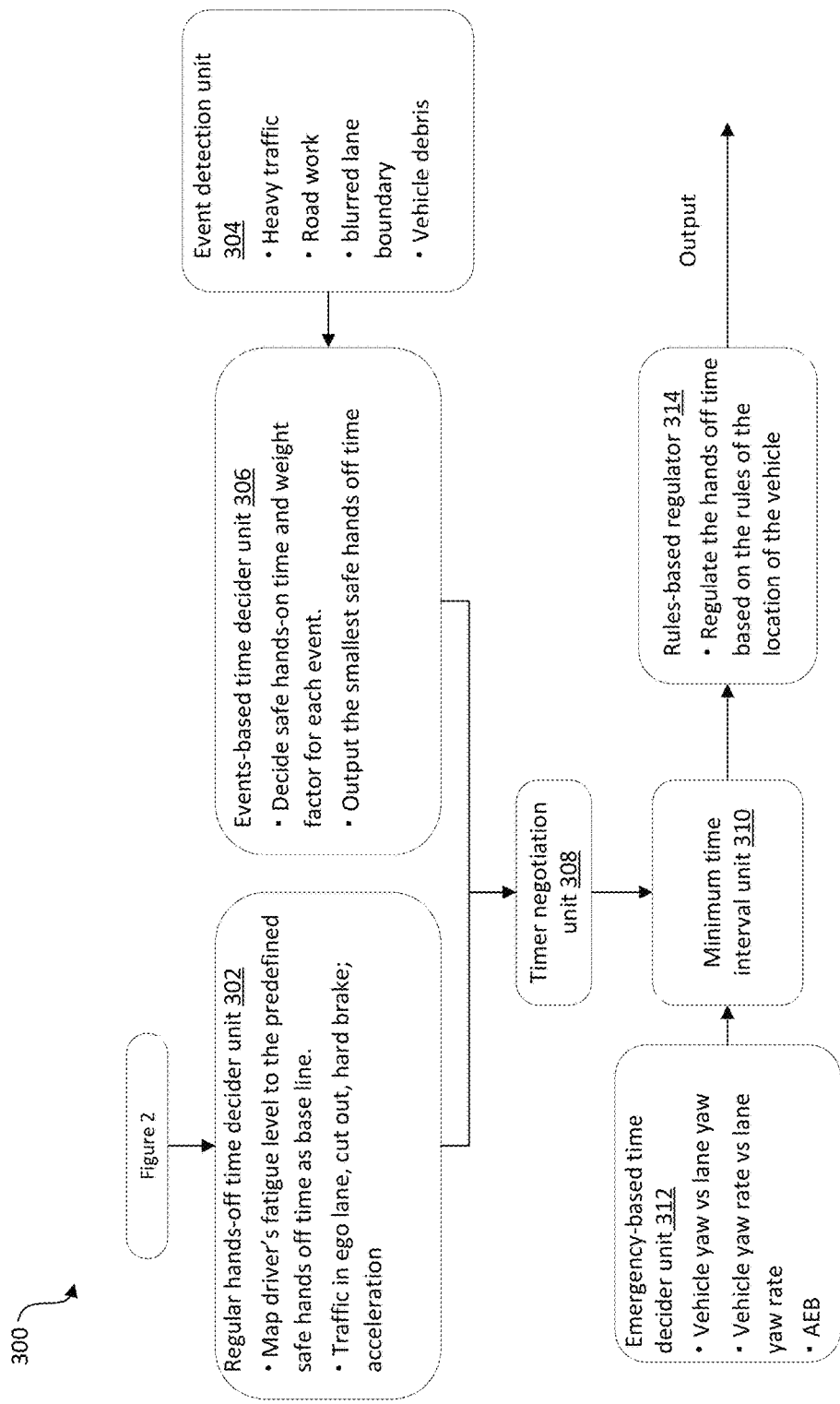
FIG. 3 is an illustration of a hands-off time warning system, according to one or more embodiments.

FIGS. 2 and 3 are illustrations 200, 300 that can be combined to illustrate a hands-off time warning system, according to one or more embodiments. FIG. 2 is an illustration 200 of a hands-off time warning system, according to one or more embodiments. The hands-off time warning system can include a driver monitoring system (DMS) 202, an online unit 204, a prediction unit 206, a sensor unit 208, a weight unit 210, decider units, an event detection unit, an emergency-based time decider unit, a timer negotiation unit, a minimum time interval unit, and a rules-based regulator. The decider units, event detection unit, emergency-based time decider unit, timer negotiation unit, minimum time interval unit, and rules-based regulator are described with more particularity with respect to FIG. 3.

The hands-off time warning system can use the DMS 202, the online unit 204, the prediction unit 206, and the sensor unit 208 to collect data related to the status of the driver, the AV, and the surrounding environment. The hands-off time warning system can use the weight unit 210 to compute a weight for data collected from the online unit 204 and the prediction unit 206. The hands-off time warning system can use the event detection unit to detect events the AV can experience on the roadway. The hands-off time warning system can use to determine candidate time intervals based on one or more of the data received from the DMS 202, the weights received from the weight unit 210, the vehicle status data received from the sensor unit 208 and events detected by the event unit. The hands-off time warning system can further factor in any detected emergencies and rules to determine a final safe hands-off time interval. The hands-off time warning system can then transmit a warning based on the final safe hands-off time interval.

The DMS 202 is operable for detecting driver drowsiness, inattentiveness, and fatigue. The DMS 202 can include sensors (e.g., image-capturing device, motion sensors, and other appropriate sensors) to collect data from the driver and the AV. For example, an image-capturing device can be integrated into the dashboard of an AV. One or more sensors can be used to collect data points of a driver's facial features while the driver is alert. These features can be used by the vehicle computer to generate a baseline profile of the driver in an alert state.

As the AV is operating on a roadway, the DMS 202 can continue to collect data from the driver and the vehicle to determine a level of fatigue of the driver. The data collected from the sensors can be used as inputs for one or more machine learning models (e.g., a convolutional neural network (CNN) trained to determine a level of fatigue of the AV driver) executing on the vehicle computer or on a remote server. The levels of fatigue can range from alert to very drowsy, and the number of levels can vary. For example, one machine learning model can be trained to determine whether the driver is in one of three fatigue states (e.g., alert, fatigued, and very fatigued). Another machine learning model can be trained to determine whether the driver in one of five fatigue states (e.g., alert, somewhat fatigued, fatigued, very fatigued, and asleep).

In any event, the machine learning model can receive sensor data collected from the driver and the vehicle. The machine learning model can compare the sensor data from the driver to a baseline of the driver in an alert state. The machine learning model (also in some instances, multiple machine learning models) can compare the sensor data from the vehicle motion to a baseline of the vehicle motion while the driver is in an alert state. The machine learning model can then use both comparisons to determine a level of fatigue of the driver. The DMS 202 can transmit the determined level of fatigue to a decider unit of the hands-off time warning system described further with respect to FIG. 3.

The hands-off time warning system can further include an online unit 204 operable to receive data from an online source. The online unit 204 can connect to the internet using various methods. For example, the AV can include antenna for transmitting and receiving a signal. In some instances, the antenna can be part of a cellular modem operable to connect to the internet using a cellular network (e.g., 3G, 4G, and 5G). In another instance, the AV can connect to the internet using a different transmission protocol, such as built in Wi-Fi hotspot that can connect to a nearby Wi-Fi network. The online unit 204 may be configured to retrieve real-time operating parameter information from the internet. For example, the online unit 204 can include an online map interface 212 for interfacing with one or more map applications. The online unit 204 can use a positioning system (e.g., a global positioning system (GPS)) to determine the location of the AV. The online unit 204 can further use the online map interface 212 to access an online mapping source for determining the operating parameters of the road type the AV is traveling upon. For example, the online unit 204 may determine whether the AV traveling on a freeway, local road, bridge, tunnel, etc. The online unit 204 can transmit the operating parameter (e.g., road type) to the decider unit of the hands-off time warning system described further with respect to FIG. 3.

The online unit 204 can further include a weather source interface 214 for interfacing with an online weather source and retrieving the real-time weather conditions outside the AV. As the AV is operating, the online unit 204 can use the weather source interface 214 to continuously access the online weather source for continuously retrieving a current weather pattern outside of the AV. For example, if the AV is traveling on interstate 5 through Seattle, Washington, the online unit 204 can continuously receive the current weather in Seattle. In some embodiments, the AV can further include a weather sensor unit 216 coupled to the AV to sense the surrounding weather conditions. The weather sensor unit 216 can include, for example, temperature sensors, air pressure sensors, humidity sensors, wind sensors, or other appropriate sensors for collecting weather related data. The online unit 204 can continuously transmit the current weather data to the weight unit 210.

The hands-off time warning system can further include a prediction unit 206 for predicting a driving pattern of surrounding traffic. The prediction unit 206 can include sensors coupled to the AV that can collect data for predicting driving patterns of other vehicles surrounding the AV. The prediction unit 206 can receive data collected by one or more sensors that is indicative of a current position of another vehicle in relation to the AV, a current speed of the other vehicle, a current distance from the other vehicle to the AV. For example, the prediction unit 206 can include light detection and ranging (LiDAR) sensors operable to transmit a laser pulse and collect reflected signals from the surrounding environment of the AV. Based on a time of flight calculation between transmitting a signal and receiving a reflected signal, the prediction unit 206 can determine parameters related to the other vehicle (e.g., position, distance, speed). The prediction unit 206 can use the parameters as inputs for a machine learning model (e.g., a CNN) that can make a prediction as to the trajectory of the other vehicle. For example, the prediction unit 206 can preprocess the data, whereby the sensor data is encoded and transformed in a machine-level language. The preprocessed data can be used as inputs for a machine learning model, which can use the data to predict potential driving patterns for the other vehicle. The machine learning model can then use various statistical methods to predict the most likely driving pattern from the predicted driving patterns. This predicted driving pattern of the other vehicle can then be transmitted to the weight unit 210.

The hands-off time warning system can further include a sensor unit 208 for determining the operating parameters of the vehicle status, such as braking system status, engine status, the roll, the pitch, the yaw, the attitude, and the speed of the AV. The roll is a rotation about a longitudinal axis of the AV, the pitch is a rotation about a transverse axis of the AV, and the yaw is a rotation about a vertical axis of the AV. The sensors can include, for example, tilt-sensors, inclinometers, antenna, or other appropriate sensors. The roll, the pitch, the yaw, and the speed of the AV can be used to determine a trajectory of the AV, which can be used in conjunction with the trajectory of another vehicle or the position of an object to determine the relative danger of a collision between the AV and the other vehicle or the object. The sensor unit 208 can include, for example, tachometers, accelerometer, gyroscopes, that can be integrated into the AV to determine, for example, the speed, direction, and rotation of the AV. The sensor unit 208 can continuously transmit the attitude, the roll, the pitch, the yaw, the speed, and other appropriate sensor data associated with the AV to the decider unit of the hands-off time warning system described further with respect to FIG. 3.

As indicated above, the online unit 204 and the prediction unit 206 can transmit operating parameter data to the weight unit 210. The online unit 204 and the prediction unit 206, together or individually, may be referred as "hands-off time warning system data collection apparatus." The weight unit 210 can compute a weight for each operating parameter and each predicted behavior. In some instances, the weight unit 210 can compute the weight based on a confidence level. In other words, the weight unit 210 can compute a weight for an operating parameter or a predicted behavior based on a confidence in the accuracy of the parameter or behavior. Each weight can be indicative of the relative danger posed by the operating parameter. For example, if a hands-off time warning system data collection apparatus transmits a first operating parameter and a second operating parameter to the weight unit 210, the evaluation unit 201 can determine a level of danger for each. The weight unit 210 can further compute a higher weight for the operating parameter associated with the higher level of danger.

The weights can be computed through rule-based methods. For example, a data evaluation unit of the weight unit 210 can access a database of road types, weather, and other vehicle behavior (e.g., driving in ego lane, driving out of ego lane, acceleration, deceleration) predictions that are mapped to different weights. In other instances, the weights are computed by applying the collected data as inputs for one or more models. In the instance that a data evaluation unit receives information related to a road type, weather, or driver behavior prediction, the data evaluation unit can access the database and retrieve the mapped weight.

The weight unit 210 can include a data evaluation unit for each of the online map interface 212, the weather source interface 214, and the prediction unit 206. The first data evaluation unit 218 can continuously receive information from the online map interface 212. The information can include a road type that the AV is currently traveling on. For example, as indicated, the road type can include a freeway, a local road, a bridge, a tunnel, a parking lot, a sharp curved road, a long downhill road, or other road type. Each road type can be associated with a different level of danger. For example, a tunnel can be associated with a higher level of danger than a freeway due to reduced light and the confined space relative to the freeway. In response to continuously receiving the road type information, the first data evaluation unit 218 can compute a real-time weight. The weight can be a value within a range of values that is indicative of the level of danger. For example, the weight can be within a range of 0 to 1, in which 0 is indicative of the least level of danger and a 1 can be indicative of the highest level of danger. In some embodiments, only non-zero weights may be assigned to input data.

For example, consider a scenario in which the AV is traveling down from point A to point B. The online map interface 212 can retrieve information from an online mapping system that the AV is traveling on a freeway. Therefore, in the instance that the AV is traveling through a freeway, the first data evaluation unit 218 can compute a weight associated with the level of danger for the freeway (e.g., a weight of 0.3). At some point, the AV can begin to travel through a tunnel. The online map interface 212 can retrieve information that the AV is traveling through the tunnel. The first data evaluation unit 218 can compute a new weight that is indicative of the level of danger of the current road type. For example, the first data evaluation unit 218 can compute a weight of 0.6 for the tunnel. As seen, the weight computed by the first data evaluation unit 218 is indicative of the current road type that the AV is traveling on. It should be appreciated that 0.3 and 0.6 are for illustration only, and the first data evaluation unit 218 can be configured to compute weights across various ranges.

As indicated above, in some instances, the weight can be based on a confidence in the accuracy of the information. The accuracy of the information can be based on various factors such as confidence in a source. For example, if the information from the online mapping system includes errors, missing data, outdated data, corrupted data, the first data evaluation unit 218 can discount the accuracy of the information. As in the example above, if the first data evaluation unit 218 receives information that the AV is traveling on the freeway and the information is indicative of trusted information, the first data evaluation unit 218 can compute a weight of 0.3. If, however, the information includes errors, missing data, corrupted data, or other indication of lack of trustworthiness, the first data evaluation unit 218 can compute a lower weight (e.g., lower weight=x, where x is <0.3).

The second data evaluation unit 220 can continuously receive information from the weather source interface 214, including the weather sensor unit 216. The information can include a weather condition in the area that the AV is currently traveling on. For example, as indicated, the weather can include rain, snow, cross-wind, or other weather type. Each weather type can be associated with a different level of danger. For example, snow or sleet can be associated with a higher level of danger than a sunny and clear due to decreased visibility and probability for loss of control in snow or sleet. In response to continuously receiving the weather information, the second data evaluation unit 220 can compute a real-time weight for the weather. The weight for the weather can be normalized with the weight for the road type. For example, the weight for the weather can also be within a range of 0 to 1, in which 0 is indicative of the least level of danger and a 1 can be indicative of the highest level of danger.

The weight for the weather can also be based on a confidence in the accuracy of the weather information from the online source and from the weather sensor unit 216. If the second data evaluation unit 220 determines that there are errors, missing data, corrupted data in the received weather information, the second data evaluation unit 220 can compute a discounted weight for the weather in the area the AV is traveling.

The third data evaluation unit 222 can continuously receive a prediction of the behavior of other drivers from the prediction unit 206. The prediction can include, for example, whether another driver is going to cut in the AV's road lane, cut out of the AV's road lane accelerate, decelerate, or other driver behavior. Each predicted driver behavior can be associated with a different level of danger. For example, a prediction that driver that is predicted to cut into the AV's road lane can result in a higher computed weight than if the other driver is predicted to stay in their own lane. The third data evaluation unit 222 continuously receiving the driver behavior predictions and compute a real-time weight for each prediction. The weight for the prediction can also be normalized For example, the weight for the prediction of the other driver behavior can also be within a range of 0 to 1, in which 0 is indicative of the least level of danger and a 1 can be indicative of the highest level of danger.

The DMS 202, the first data evaluation unit 218, the second data evaluation unit 220, the third data evaluation unit 222, and the sensor unit 208 can transmit their respective outputs, including the computed weights, to a regular hands-off time decider unit of the hands-off time warning system as illustrated in FIG. 3.

FIG. 3 is an illustration 300 of a hands-off time warning system, according to one or more embodiments. As illustrated, the regular hands-off time decider unit 302 can receive the outputs of the DMS 202, the first data evaluation unit 218, the second data evaluation unit 220, the third data evaluation unit 222, and the sensor unit 208. The regular hands-off time decider unit 302 can receive the driver's level of fatigue from the DMS 202 and map the level to a baseline time interval. For illustration, Table 1 includes driver fatigue level mapped to a baseline time interval. As illustrated, the DMS 202 can categorize the driver's level of fatigue into a potential state (e.g., alert, drowsy, and very drowsy). Each fatigue state is mapped to a respective baseline time interval. For example, the first state (e.g., alert state) is mapped to time interval A, the second state (e.g., drowsy state) is mapped to time interval B, and the third state (e.g., very drowsy state) is mapped to time interval C.

TABLE 1

| Driver Fatigue Level | Baseline Time Interval |
| --- | --- |
| First state (e.g., Alert) | Time Interval A |
| Second state (e.g., Drowsy) | Time Interval B |
| Third state (e.g., Very Drowsy) | Time Interval C |

Each baseline time interval is a length of time that a driver can keep their hands-off of the steering wheel before a warning is issued. Each of the baseline time intervals can include a different length of time that corresponds to a respective fatigue level. The time interval A can be the longest time interval as the driver is alert. Time interval B can be a shorter length of time as the driver is exhibiting signs of drowsiness. Time interval C can be the shortest time interval because the driver is exhibiting signs of being very drowsy. As an example, the regular hands-off time decider unit 302 can receive an indication that the driver is drowsy and map the drowsy state to time interval B. It should be appreciated that Table 1 describes three levels of fatigue. However, as indicated above, the hands-off time warning system can be configured for various amounts of levels of fatigue. For example, in another instance, the hands-off time warning system can be configured for less than or greater than three levels of fatigue.

The regular hands-off time decider unit 302 can then update the determined baseline time interval based on the outputs of the first data evaluation unit 218, the second data evaluation unit 220, the third data evaluation unit 222, and the sensor unit 208. The update can be based on factoring in a level of danger into the baseline time interval based on an operating parameter, such as road type, weather condition, predicted behavior of another driver, and vehicle status. The amount of update adjustment can be proportional to the computed of weights of the operating parameters.

The regular hands-off time decider unit 302 can aggregate the computed weights and vehicle status to determine a compounded level of danger. In particular, the regular hands-off time decider unit 302 can aggregate the computed weights to determine a compounded weight. For example, consider a first scenario in which the online map interface 212 indicates that the AV is traveling on a bridge, where a bridge is associated with a higher level of danger and consequently a weight that corresponds to the higher level of danger. The weather source interface 214 indicates that the weather conditions include hail, where hail is associated with a higher level of danger and consequently a weight that corresponds to the higher level of danger. The prediction unit 206 can sense that that are no other vehicles surrounding the AV and therefore there is no predicted behavior of another driver. Furthermore, the vehicle status can indicate that the AV is traveling downhill, which is indicative of increased danger. The regular hands-off time decider unit 302 can aggregate the weight associated with the bridge and the weight associated with the hail and the vehicle's inclined status to update the baseline time interval to determine a modified time interval. As an example, a baseline hands-off time interval can be 20 seconds and a determined pitch angle of the AV can be −2 degrees indicating the AV is moving downhill. The baseline time interval can be modified as 20+ (−2.0*coefficient), wherein the coefficient can be pre-determined. The modified time interval can be shorter than the baseline time interval, as the driver is afforded less time to keep their hands-off the wheel in instances where there is an indication of danger.

The hands-off time warning system can further include an event detection unit 304 for detecting events associated with a roadway. The event detection unit 304 can receive information from any of the previously described sources from FIG. 2. For example, the event detection unit 304 can receive information related to how heavy traffic is, road work ahead, from the online map interface 212. For example, many map applications include navigation features that provide warnings for upcoming traffic accidents, and traffic data for roads that a vehicle is traveling on. The event detection unit 304 can, for example, use an application programming interface (API) to access this information. The event detection unit 304 can receive information regarding an obstacle, such as vehicle debris, from prediction unit 206. The prediction unit 206 is configured to receive data from multiple sensors, such as LiDAR, which are configured to transmit signals and collect reflected signals to characterize the surrounding environment. As described above, sensors are used to characterize surrounding vehicles. However, in many instances, the signals are reflected off of stationary objects, such as barriers, signs, and vehicle debris. The prediction unit's machine learning model can compare the reflected signals to baseline signals to determine whether the signal is reflected from a moving vehicle or a stationary object. In the instance that the machine learning model determines that the signal is reflected from a stationary object, the machine learning model can classify the object (e.g., an obstacle, debris, barrier, sign) and provide the information to the event detection unit 304. An indication of an object on or about the trajectory of the AV can be considered a debris event.

The event detection unit 304 can transmit each determined event to the events-based time decider unit 306. The event-based time decider unit 306 can determine a time interval and a weight for each event. Each event can be associated with a respective time interval stored in a database. The event-based time decider unit 306 can access the database and find a time interval mapped to a respective event. For illustration Table 2 includes events mapped to time interval. For example, heavy traffic can be mapped to event time interval D, road work can be mapped to event time interval E, and vehicle debris can be mapped to event time interval F.

TABLE 2

| Event | Event Time Interval |
|---|---|
| Heavy traffic | Event Time Interval D |
| Road work | Event Time Interval E |
| Vehicle Debris | Event Time Interval F |

Consider an example, in which heavy traffic event is detected and the traffic flow is over 500 vehicles/hour, which corresponds to the event time interval D and a default weight value 1.0. As time progresses, a higher level of traffic flow is detected (e.g., 1000 vehicles/hour), the weight value can be modified (e.g., from 1.0 to 0.8). furthermore, The event time interval D can further be modified (e.g., D*0.8), to reflect the modified weight, which reflects a shorter time for hands-off steering.

The event-based time decider unit 306 can determine a shortest time interval based on the determined event(s). If the event detection unit 304 only detected a single event, then the shortest time interval is the event time interval associated with the event. For example, if the event detection unit 304 detects an obstacle, such as vehicle debris, then the shortest time interval is event time interval F. If the event detection unit 304 detects more than one event, then the event-based time decider unit 306 selects the shorter of the associated event time intervals. For example, if the event detection unit 304 detects road work and vehicle debris, then the event-based time decider unit 306 selects the shorter of event time interval E and event time interval F.

The regular hands-off time decider unit 302 can output the modified baseline time interval to a timer negotiation unit 308. The events-based time decider unit 306 can transmit the shortest event time interval and the associated weight to the timer negotiation unit 308. The timer negotiation unit 308 recomputes the safe hands-off time using the modified baseline time interval and the shortest event time interval. For example, consider a scenario in which the current safe hands-off time interval is x time units long. For the hands-off time warning system, this is the current amount of time that the driver of an AV is allowed to keep their hands-off of the steering wheel before a warning is issued. The timer negotiation unit 308 can receive the modified baseline time interval, which is y time units long, and the shortest event time interval, which is z units long. The timer negotiation unit 308 can further determine which of the modified baseline time interval and the shortest event time interval is shorter (e.g., is y>z or is y<z) to determine a candidate time interval. The timer negotiation unit 308 can further transmit the candidate time interval to a minimum time interval unit 310.

The minimum time interval unit 310 can determine whether the candidate time interval should be reduced further based on whether an emergency-based time decider unit 312. The emergency-based time decider unit 312 can receive data from one or more sources (e.g., an AV self-driving system) to determine whether an emergency event is occurring. The received data can be compared to baseline data and various thresholds to detect an emergency. The emergency-based time decider unit 312 can detect an emergency event in various scenarios.

Certain situations can be considered emergencies without a comparison with a baseline. In particular, the emergency-based time decider unit 312 can be configured with a table of situations in which an emergency event is inherent. If the emergency-based time decider unit 312 receives data that corresponds to a situation described in the table, the emergency-based time decider unit 312 can detect an emergency. For example, the emergency-based time decider unit 312 can receive data from the sensor unit 208 that the AV is an automatic emergency braking (AEB) scenario. In this situation, the emergency-based time decider unit 312 does not compare the AEB scenario to a baseline braking scenario. The AV being in an AEB scenario is an emergency. The emergency-based time decider unit 312 can receive the data from the sensor unit 208 indicating that the AV is in an AEB scenario. The emergency-based time decider unit 312 can compare the data to a table of emergencies and detect the emergency.

The emergency-based time decider unit 312 can transmit an indication of a detected emergency event to the minimum time interval unit 310. In the instance that the minimum time interval unit 310 receives an indication of a detected emergency, the safe hands-off steering time is set to 0. The minimum time interval unit 310 then transmits the zero time interval to the rule-based regulator 314.

If the minimum time interval unit 310 does not receive an indication of an emergency event from the emergency-based time decider unit 312, the candidate time interval is transmitted to the rules-based regulator 314.

The rules-based regulator 314 receives either the zero time interval or the candidate time interval. In the instance that the rules-based regulator 314 receives the zero time interval, the rules-based regulator 314 outputs the zero time interval as the identified final time interval. In addition, and in response to the output, the hands-off time warning system can audibly report the event name and a safe hands-off time (e.g., the speakers project the words "AEB" and "0 seconds"). The hands-off time warning system can also display a visual warning displayed on an HMI of the AV (e.g., the HMI can display the words "AEB" and "0 seconds").

In the instance that the rules-based regulator 314 receives the candidate time interval, the rules-based regulator 314 compares the candidate time interval to any rules regarding hands-off steering wheel time intervals. The rules can be legal rules (e.g., statutes, common law, code, regulations), standards (e.g., autonomous vehicle industry standards), or manufacturer rules (e.g., AV manufacturer rule or software producer rule). The rules-based regulator 314 can store one or more rules in a database and can compare the candidate time interval with a rules-based time interval. The rules-based regulator 314 can select the shorter of the candidate time interval with a rules-based time interval and output the shorter time interval to identify the final time interval.

Figure 4:
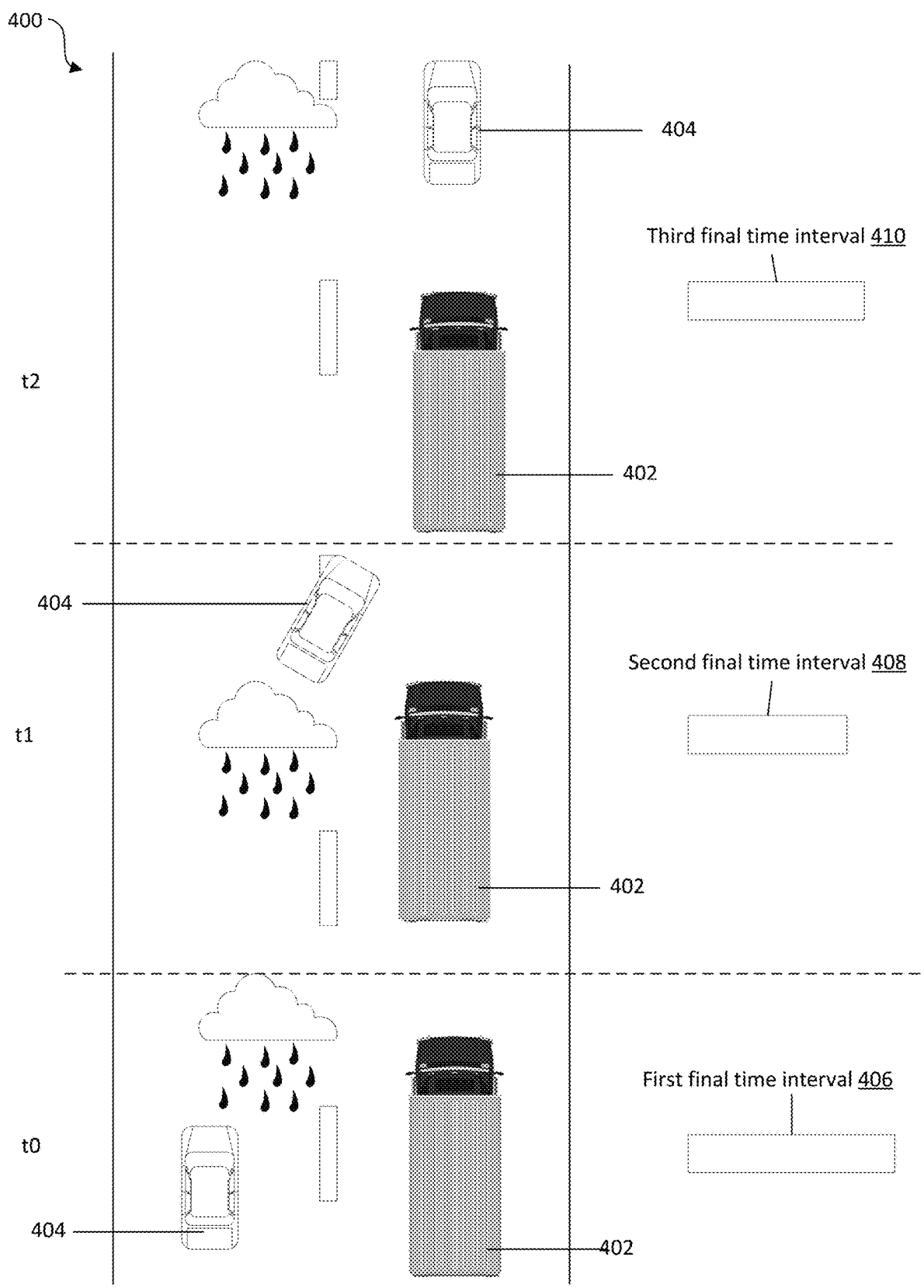
FIG. 4 is an illustration of a continuous nature of hands-off time warning system, according to one or more embodiments.

FIG. 4 is an illustration of a continuous nature of hands-off time warning system, according to one or more embodiments. At t0, an AV 402 can be traveling along the right lane of a roadway. A DMS can determine a fatigue level of the driver of the AV 402. The hands-off time warning system of the AV 402 can receive information from the weather source interface 214 or the weather sensor unit 216 that it is raining over the AV's area. The hands-off time warning system can further receive a map from the online map interface 212 or a map stored locally on the AV, to determine that the AV 402 is traveling on a freeway. The hands-off time warning system of the AV 402 can further receive information from the prediction unit 206 that another vehicle 404 is in the neighboring lane. The prediction unit 206 can further generate a prediction that another vehicle's is going to remain in the neighboring lane. The hands-off time warning system can further use decider units to determine a weight associated with the rain, freeway, and driving pattern of the other vehicle 404 to output a first final time interval 406.

At t1, the prediction unit 206 can generate a prediction that the other vehicle 404 is about to swerve into the lane of the AV 402. The other operating parameters (e.g., rain, freeway) can remain the same. Based on the change of the prediction, a decider unit can change the weight of the prediction to reflect the increased danger of the other vehicle 404 switching lanes in front of the AV 402. Based on the weight change, the current yaw pitch, and angle of the AV, the hands-off time warning system can output a second final time interval 408. The second final time interval 408 can be shorter than the first final time interval 406 to reflect the added danger of the other vehicle 404 turning into the AV's lane.

At t2, the prediction unit can generate a prediction that the other vehicle 404 will remain in the AV's lane at a distance in front of the AV 402. The other operating parameters (e.g., rain, freeway) can remain the same. Based on the change of the prediction, the decider unit can change the weight of the prediction to reflect the decreased danger of the other vehicle 404 from that of switching lanes in front of the AV 402. Based on the weight change, the current yaw pitch, and angle of the AV, the hands-off time warning system can output a third final time interval 410. The third final time interval 410 can be shorter than the first final time interval 406 to reflect the added danger of the other vehicle 404 in front of the AV 402. The third final time interval 410 can be longer than the second final time interval 408 to reflect the decreased danger associated with the other vehicle 404 switching lanes in front of the AV 402.

Figure 5:
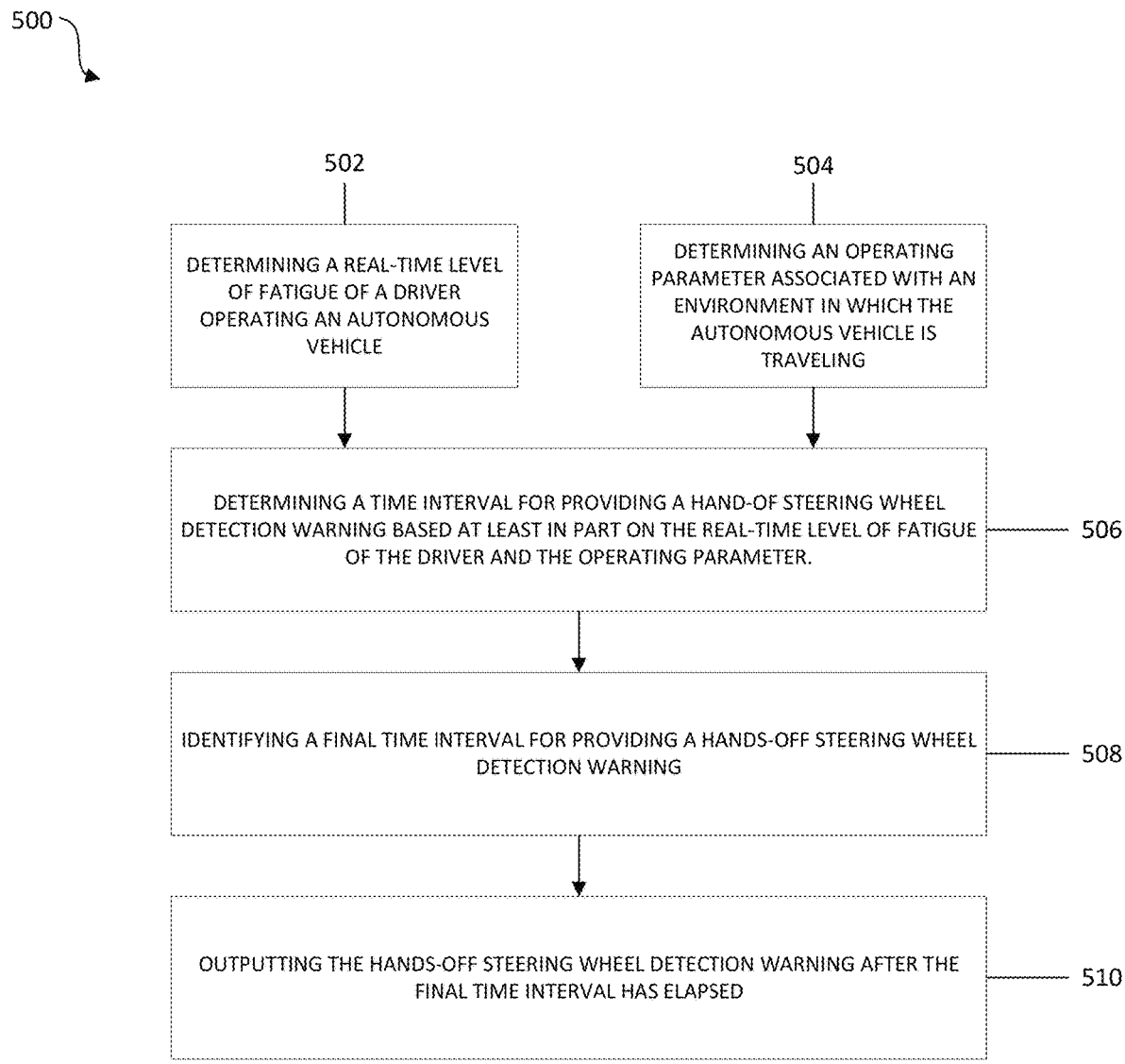
FIG. 5 is a process for identifying a final time interval by a hands-off time warning system, according to one or more embodiments.

FIG. 5 is a process 500 for identifying a final time interval by a hands-off time warning system, according to one or more embodiments. While some operations of process 500 are described as being performed by computers, it should be understood that any suitable device may be used to perform one or more operations of this processes. Processes 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At 502, the process can include a vehicle computer determining a real-time level of fatigue of a driver of the autonomous vehicle (AV). The vehicle computer can include a hands-off time warning system, which can include a DMS. The DMS can collect image data of the driver as the driver is operating the AV. The DMS can extract features from the images and compare the features to baseline features. Based on the comparison, the DMS can determine a level of fatigue of the driver of the AV. The DMS can further output the level of fatigue to a regular hands-off time decider unit of the vehicle computer.

At 504, the process can include the vehicle computer determining an operating parameter associated with an environment in which the autonomous vehicle is traveling. The operating parameter can include, for example, a road type that the AV is traveling on, a weather condition surrounding the AV, a prediction of a driving pattern of another vehicle in proximity to the AV, and a vehicle status. The operating parameter can be received through various sources. For example, the road type can be received from an online map application using an online map interface or a map stored locally on the AV by the hands-off time warning system. As illustrated, the vehicle computer can perform step 502 in parallel with step 504.

The weather condition can be received from an online weather service using a weather source interface or a weather sensor unit coupled to the AV. The weather sensor unit can include, for example, temperature sensors, air pressure sensors, humidity sensors, wind sensors, or other appropriate sensors to measure weather related data and determining a real-time weather condition surrounding the AV. The weather condition can be transmitted to a weight unit of the vehicle computer.

The prediction of the driver behavior of the other vehicle in proximity to the AV can be received from a prediction unit. The prediction unit can include a machine learning model trained to receive data and generate a prediction as to the driver. The prediction unit can include multiples sensors mounted on the AV. The sensors can be configured to transmit signals and collect reflected signals to characterize the surrounding environment. The machine learning model can receive the sensor data to determine a driving pattern for the other vehicle. The driving pattern prediction outputted by a machine learning model can be transmitted to the weight unit of the vehicle computer.

The vehicle status can be measured and received by a sensor unit mounted to the AV. The sensors can include, for example, tilt-sensors, inclinometers, antenna, or other appropriate sensors for determining various vehicle status parameters. The vehicle status parameters can include, for example, the attitude, the roll, the pitch, the yaw, the speed, a braking status, and other appropriate vehicle status parameters. The vehicle status parameters can be transmitted to the regular hands-off time decider unit of the vehicle computer.

At 506, the process can include the vehicle computer determining a time interval for providing a hands-off steering wheel detection warning based at least in part on the real-time level of fatigue of the driver, and the operating parameter. The weight unit can determine weights for each of the operating parameters. The regular hands-off time decider unit can map the determined level of fatigue to a respective baseline time interval and modify the baseline time interval based on the weights.

In some instances, the vehicle computer can detect an event using an event detection unit. If the event detection unit detects an event, an event-based time decider unit can map the event to a respective predetermined time interval and a weight. If the event detection unit detects multiple events, the event-based time decider unit can select the shortest of the predetermined time intervals and associated weight. A timer negotiation unit can receive the modified baseline time interval and the event-based time interval, if any, and select the shortest interval as a candidate time interval. The time negotiation unit can transmit the candidate time interval to a minimum time interval unit of the vehicle computer.

At 508, the process can include the vehicle computer identifying a final time interval for providing a hands-off steering wheel detection warning. The minimum time interval unit can either forward the candidate time interval to a rules-based regulator of the vehicle computer or modify the time interval to zero in the event there is an emergency. The vehicle computer can include an emergency-based time decider unit for determining whether there is an emergency. The emergency-based time decider unit can receive data measured from one or more sources (e.g., an AV self-driving system) to identify whether an emergency event is occurring. The received data can be used to identify various emergencies. For example, the data can be used to determine whether the AV is in an AEB state, whether AV is close to colliding with another object, whether the AV's trajectory indicates the AV is going to run off the road, or other AV related emergency.

If the minimum time interval unit does not receive any indication of an emergency, then the candidate time interval can be transmitted to a rules-based regulator. If the minimum time interval unit does receive any indication of an emergency, the minimum time interval unit can identify the safe hands-off time interval as zero and transmit the zero time interval to the rules-based regulator. The rules-based regulator can compare the candidate time interval to any rules regarding hands-off steering wheel time intervals (e.g., legal rules, standards, manufacturer rules, software rules) to identify the final time interval. The rules-based regulator can select the shorter of the candidate time interval and a rules-based time interval and output the shorter time interval as the final time interval.

At 510, the process can include the vehicle computer outputting the hands-off steering wheel detection warning after the final time interval has elapsed. The vehicle computer can detect a driver taking their hands-off of the AV's steering wheel. Upon expiration of the final time interval, the vehicle computer can issue a warning for the driver to put their hands back on the steering wheel. The warning can include an audible warning projected from a speaker and a visual warning displayed on an HMI of the AV.

In some instances, the hands-off time warning system can detect an event, such as a heavy traffic, road work. In these instances, the audible warning can report the event name and a safe hands-off time (e.g., the speakers project the words "heavy traffic" and "3 seconds"). In cases of a detected event, the HMI can display the event name and the safe hands-off time (e.g., the HMI can display the words "heavy traffic" and "3 seconds" in addition to or alternatively to the projection by the speakers).

Figure 6:
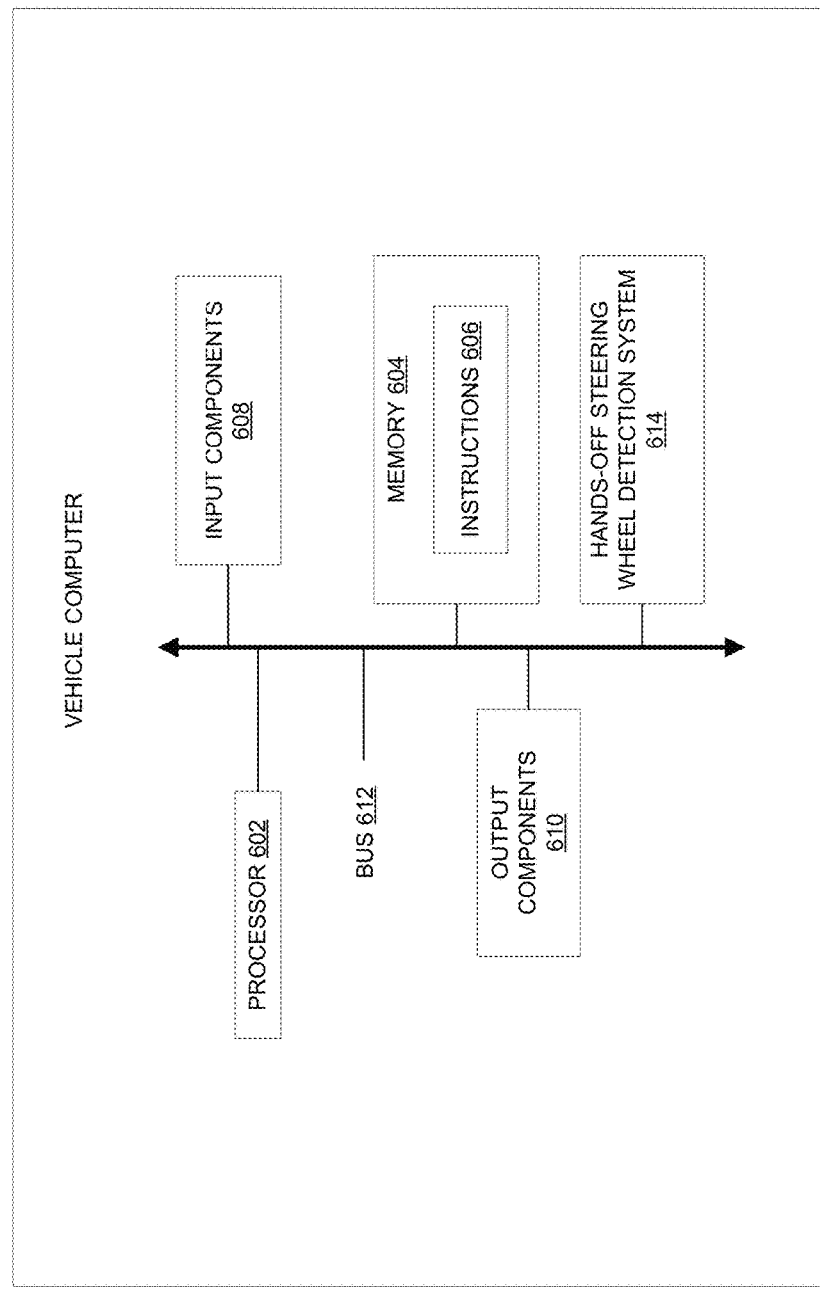
FIG. 6 is a block diagram of an example of a computing device usable for implementing some aspects of the present disclosure.

FIG. 6 is a block diagram of an example of a vehicle computer 600 usable for implementing some aspects of the present disclosure. The vehicle computer 600 includes a processor 602 coupled to a memory 604 via a bus 612. The processor 602 can include one processing device or multiple processing devices. Examples of the processor 602 include a Field-Programmable Gate Array (FPGA), an application-specific integrated circuit (ASIC), a microprocessor, or any combination of these. The processor 602 can execute instructions 606 stored in the memory 604 to perform operations. In some examples, the instructions 606 can include processor-specific instructions generated by a compiler or an interpreter from code written in any suitable computer-programming language, such as C, C++, C#, Python, or Java.

The memory 604 can include one memory device or multiple memory devices. The memory 604 may be non-volatile and include any type of memory device that retains stored information when powered off. Examples of the memory 604 can include electrically erasable and programmable read-only memory (EEPROM), flash memory, or any other type of non-volatile memory. At least some of the memory 604 includes a non-transitory computer-readable medium from which the processor 602 can read instructions 606. A computer-readable medium can include electronic, optical, magnetic, or other storage devices capable of providing the processor 602 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 606.

The vehicle computer 600 may also include other input and output (I/O) components. The input components 608 can include a mouse, a sensor(s), access point, antenna, a keyboard, a trackball, a touch pad, a touch-screen display, or any combination of these. The output components 610 can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device The vehicle computer 600 may also include a hands-off time warning system 614 as described above. The hands-off time warning system 614 can include a set of instructions for instructing the processor 602 for receiving data from various sources and computing a final time interval. The hands-off time warning system 614 can use the bus 612 to access other elements of the vehicle computer to effectuate any of the above described functionality. For example, the hands-off time warning system 614 can include instructions for collecting data from one or more input components, such as a sensor or antenna. The hands-off time warning system 614 can include instructions for retrieving a machine learning model from memory 604 and executing the model to generate an output, such as a predicted trajectory of a neighboring vehicle. The hands-off time warning system 614 can further include instructions presenting a warning using an output component 610, such as a speaker, a dashboard display, or a vibration device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein, can be combined with any other examples.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques, including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate, and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   determining, by a vehicle computer, a real-time level of fatigue of a driver of an autonomous vehicle;

determining, by the vehicle computer, an operating parameter associated with an environment in which the autonomous vehicle is traveling;
generating, by the vehicle computer and using a machine learning model, a predicted driving pattern of a second vehicle traveling in the environment;
determining, by the vehicle computer, a time interval for providing a hands-off steering wheel detection warning based at least in part on the real-time level of fatigue of the driver, the operating parameter, and the predicted driving pattern of the second vehicle;
identifying, by the vehicle computer, a final time interval for providing a hands-off steering wheel detection warning; and
outputting, by the vehicle computer, the hands-off steering wheel detection warning after the final time interval has elapsed.

2. The method of claim 1, wherein generating the predicted driving pattern of the second vehicle traveling in the environment comprises:
receiving, via a light detection and ranging (LiDAR) system mounted on the autonomous vehicle, environment information collected from the environment of the autonomous vehicle, wherein the environment comprises the second vehicle;
accessing the machine learning model based at least in part on receiving the environment information; and
causing the machine learning model to generate the predicted driving pattern of a second vehicle, wherein the environment information is used as an input for the machine learning model.

3. The method of claim 1, wherein determining the real-time level of fatigue comprises:
receiving, via a sensor of a driving monitoring system (DMS), first facial information of the driver;
generating a baseline driver profile based at least in part on the first facial information;
receiving, via a sensor of the DMS, second facial information of the driver while the autonomous vehicle is traveling;
accessing a machine learning model based at least in a part on receiving the second facial information; and
causing the machine learning model to generate a prediction of the real-time level of fatigue of the driver based least in part on the baseline driver profile and the second facial information, wherein the second facial information is used as an input for the machine learning model.

4. The method of claim 1, wherein determining the real-time level of fatigue comprises:
receiving, via a sensor, first autonomous vehicle motion information;
generating a baseline autonomous vehicle motion profile based at least in part on the first autonomous vehicle motion information;
receiving, via the sensor, second autonomous vehicle motion information;
accessing a machine learning model based at least in a part on receiving the second autonomous vehicle motion information while the autonomous vehicle is traveling; and
causing the machine learning model to generate a prediction of the real-time level of fatigue of the driver based least in part on the baseline autonomous vehicle motion profile and the second autonomous vehicle motion information, wherein the second autonomous vehicle motion information is used as an input for the machine learning model.

5. The method of claim 1, wherein the real-time level of fatigue comprises a fatigue state, and wherein the fatigue state comprises an alert state, a fatigued state, or a very fatigued state.

6. The method of claim 1, further comprising;
capturing, using a sensor mounted on the autonomous vehicle, real-time data from the environment in which the autonomous vehicle is traveling, wherein the operating parameter is determined based on the real-time data captured from the environment.

7. The method of claim 1, wherein the time interval is a first candidate time interval, wherein the machine learning model is a first machine learning model, and wherein the method further comprises:
receiving, via a LiDAR system mounted on the autonomous vehicle, environment information collected from the environment of the autonomous vehicle, wherein the environment comprises an object;
determining, via a second machine learning model, that the object is a stationary object;
determining a second candidate time interval for providing the hands-off steering wheel detection warning based at least in part on determining that the object is a stationary object;
comparing the first candidate time interval and the second candidate time interval; and
selecting a shorter of the first candidate time interval and the second candidate time interval as the final time interval based at least in part on the comparing.

8. A vehicle computer, comprising:
one or more processors; and
one or more computer-readable media including instructions that, when executed by the one or more processors, cause a vehicle computer to:
determine a real-time level of fatigue of a driver of an autonomous vehicle;
determine an operating parameter associated with an environment in which the autonomous vehicle is traveling;
generate, using a machine learning model, a predicted driving pattern of a second vehicle traveling in the environment;
determine a time interval for providing a hands-off steering wheel detection warning based at least in part on the real-time level of fatigue of the driver, the operating parameter, and the predicted driving pattern of the second vehicle;
identify, a final time interval for providing a hands-off steering wheel detection warning; and
output the hands-off steering wheel detection warning after the final time interval has elapsed.

9. The vehicle computer of claim 8, wherein generating the predicted driving pattern of the second vehicle traveling in the environment comprises:
receiving, via a LiDAR system mounted on the autonomous vehicle, environment information collected from the environment of the autonomous vehicle, wherein the environment comprises the second vehicle;
accessing the machine learning model based at least in part on receiving the environment information; and
causing the machine learning model to generate the predicted driving pattern of a second vehicle, wherein the environment information is used as an input for the machine learning model.

10. The vehicle computer of claim 8, wherein determining the real-time level of fatigue comprises:
- receiving, via a sensor of a DMS, first facial information of the driver;
- generating a baseline driver profile based at least in part on the first facial information;
- receiving, via a sensor of the DMS, second facial information of the driver while the autonomous vehicle is traveling;
- accessing a machine learning model based at least in a part on receiving the second facial information; and
- causing the machine learning model to generate a prediction of the real-time level of fatigue of the driver based least in part on the baseline driver profile and the second facial information, wherein the second facial information is used as an input for the machine learning model.

11. The vehicle computer of claim 8, wherein determining the real-time level of fatigue comprises:
- receiving, via a sensor, first autonomous vehicle motion information;
- generating a baseline autonomous vehicle motion profile based at least in part on the first autonomous vehicle motion information;
- receiving, via the sensor, second autonomous vehicle motion information;
- accessing a machine learning model based at least in a part on receiving the second autonomous vehicle motion information while the autonomous vehicle is traveling; and
- causing the machine learning model to generate a prediction of the real-time level of fatigue of the driver based least in part on the baseline autonomous vehicle motion profile and the second autonomous vehicle motion information, wherein the second autonomous vehicle motion information is used as an input for the machine learning model.

12. The vehicle computer of claim 8, wherein the real-time level of fatigue comprises a fatigue state, and wherein the fatigue state comprises an alert state, a fatigued state, or a very fatigued state.

13. The vehicle computer of claim 8, wherein the instructions that, when executed by the one or more processors, further cause a vehicle computer to:
- capturing, using a sensor mounted on the autonomous vehicle, real-time data from the environment in which the autonomous vehicle is traveling, wherein the operating parameter is determined based on the real-time data captured from the environment.

14. The vehicle computer of claim 8, wherein the time interval is a first candidate time interval, wherein the machine learning model is a first machine learning model, and wherein the instructions that, when executed by the one or more processors, further cause a vehicle computer to:
- receive, via a LiDAR system mounted on the autonomous vehicle, environment information collected from the environment of the autonomous vehicle, wherein the environment comprises an object;
- determine, via a second machine learning model, that the object is a stationary object;
- determine a second candidate time interval for providing the hands-off steering wheel detection warning based at least in part on determining that the object is a stationary object;
- compare the first candidate time interval and the second candidate time interval; and
- select a shorter of the first candidate time interval and the second candidate time interval as the final time interval based at least in part on the comparing.

15. One or more non-transitory computer-readable media having stored thereon a sequence of instructions that, when executed by one or more processors, causes a vehicle computer to:
- determine a real-time level of fatigue of a driver of an autonomous vehicle;
- determine an operating parameter associated with an environment in which the autonomous vehicle is traveling;
- generate, using a machine learning model, a predicted driving pattern of a second vehicle traveling in the environment;
- determine a time interval for providing a hands-off steering wheel detection warning based at least in part on the real-time level of fatigue of the driver, the operating parameter, and the predicted driving pattern of the second vehicle;
- identify, a final time interval for providing a hands-off steering wheel detection warning; and
- output the hands-off steering wheel detection warning after the final time interval has elapsed.

16. The one or more non-transitory computer-readable media of claim 15, wherein generating the predicted driving pattern of the second vehicle traveling in the environment comprises:
- receiving, via a LiDAR system mounted on the autonomous vehicle, environment information collected from the environment of the autonomous vehicle, wherein the environment comprises the second vehicle;
- accessing the machine learning model based at least in part on receiving the environment information; and
- causing the machine learning model to generate the predicted driving pattern of a second vehicle, wherein the environment information is used as an input for the machine learning model.

17. The one or more non-transitory computer-readable media of claim 15, wherein determining the real-time level of fatigue comprises:
- receiving, via a sensor of a DMS, first facial information of the driver;
- generating a baseline driver profile based at least in part on the first facial information;
- receiving, via a sensor of the DMS, second facial information of the driver while the autonomous vehicle is traveling;
- accessing a machine learning model based at least in a part on receiving the second facial information; and
- causing the machine learning model to generate a prediction of the real-time level of fatigue of the driver based least in part on the baseline driver profile and the second facial information, wherein the second facial information is used as an input for the machine learning model.

18. The one or more non-transitory computer-readable media of claim 15, wherein determining the real-time level of fatigue comprises:
- receiving, via a sensor, first autonomous vehicle motion information;
- generating a baseline autonomous vehicle motion profile based at least in part on the first autonomous vehicle motion information;
- receiving, via the sensor, second autonomous vehicle motion information;

accessing a machine learning model based at least in a part on receiving the second autonomous vehicle motion information while the autonomous vehicle is traveling; and causing the machine learning model to generate a prediction of the real-time level of fatigue of the driver based least in part on the baseline autonomous vehicle motion profile and the second autonomous vehicle motion information, wherein the second autonomous vehicle motion information is used as an input for the machine learning model.

19. The one or more non-transitory computer-readable media of claim 15, wherein the real-time level of fatigue comprises a fatigue state, and wherein the fatigue state comprises an alert state, a fatigued state, or a very fatigued state.

20. The one or more non-transitory computer-readable media of claim 15, wherein the time interval is a first candidate time interval, wherein the machine learning model is a first machine learning model, and wherein the instructions that, when executed by the one or more processors, further cause a vehicle computer to:

receive, via a LiDAR system mounted on the autonomous vehicle, environment information collected from the environment of the autonomous vehicle, wherein the environment comprises an object;

determine, via a second machine learning model, that the object is a stationary object;

determine a second candidate time interval for providing the hands-off steering wheel detection warning based at least in part on determining that the object is a stationary object;

compare the first candidate time interval and the second candidate time interval; and select a shorter of the first candidate time interval and the second candidate time interval as the final time interval based at least in part on the comparing.

* * * * *